Aug. 25, 1931.  E. C. PETERSON  1,820,491
VEHICLE LOCKING MECHANISM
Filed June 2, 1924  3 Sheets-Sheet 1
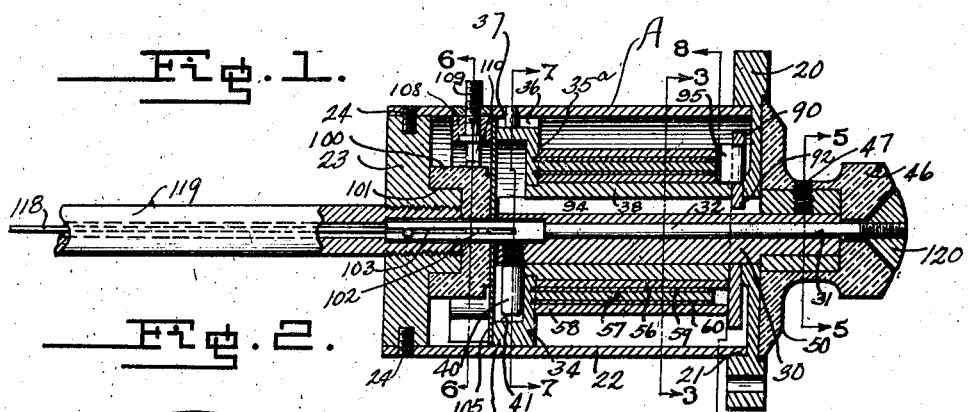
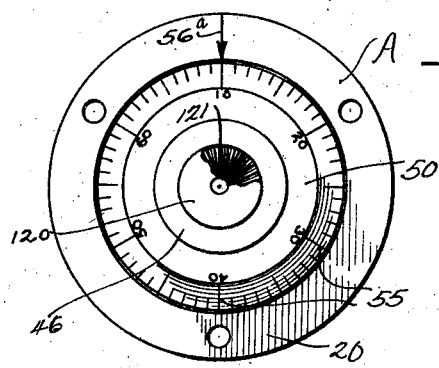
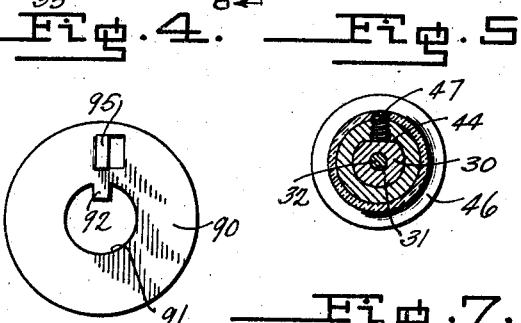
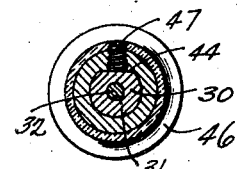
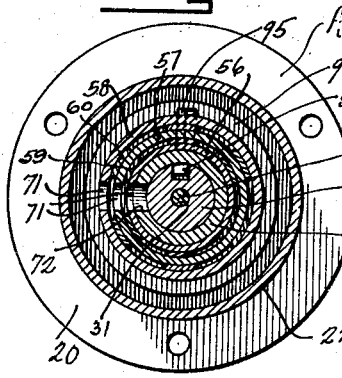
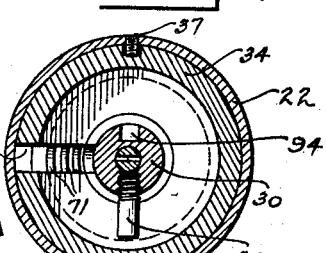
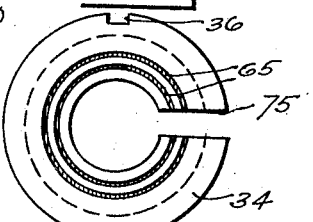
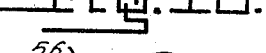
Inventor
Elmer C. Peterson
By Lancaster and Allwine
Attorneys

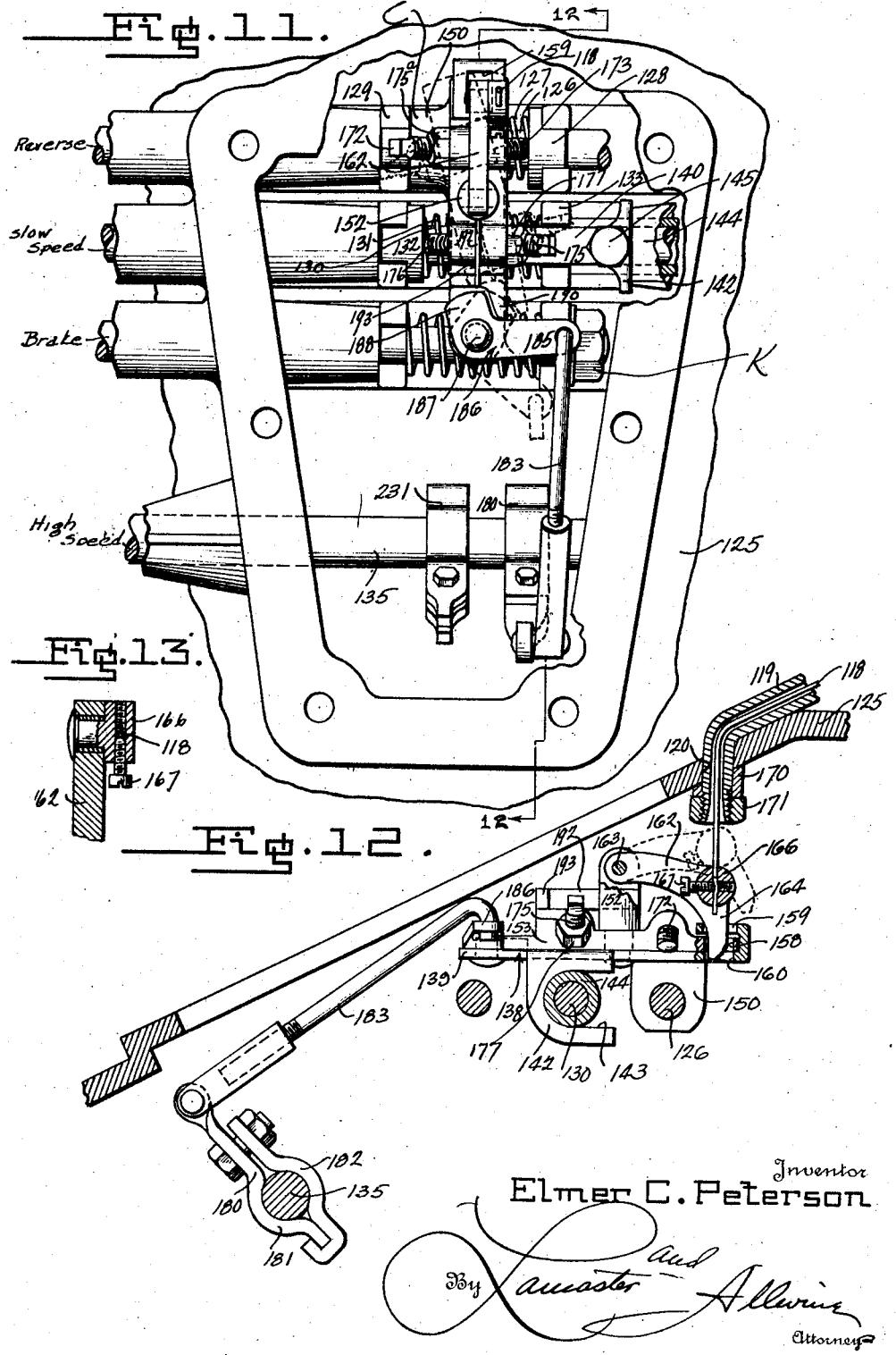

Aug. 25, 1931.  E. C. PETERSON  1,820,491
VEHICLE LOCKING MECHANISM
Filed June 2, 1924   3 Sheets-Sheet 3
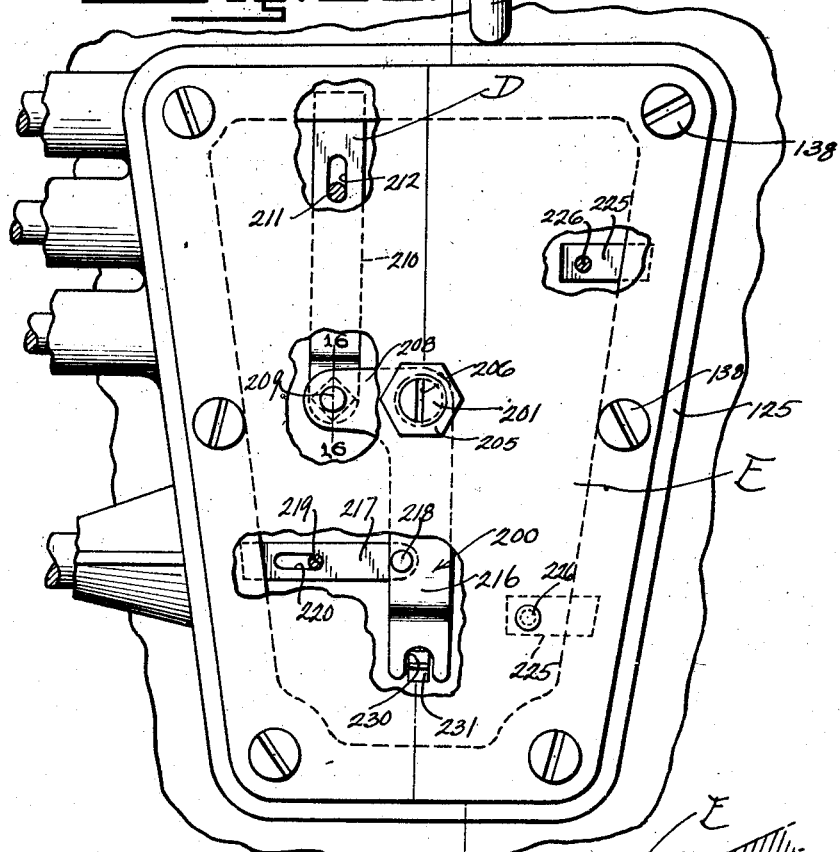
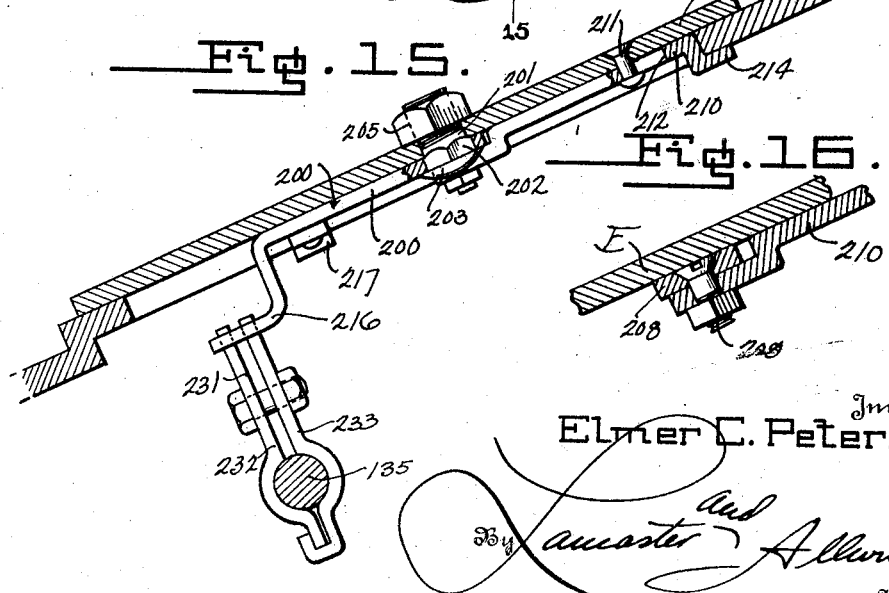
Inventor
Elmer C. Peterson
By Lancaster and Allwin
Attorney Patented Aug. 25, 1931

1,820,491

UNITED STATES PATENT OFFICE

ELMER C. PETERSON, OF CLEVELAND, OHIO, ASSIGNOR TO THE BLOSSOM LOCK COMPANY, OF CLEVELAND, OHIO, A CORPORATION OF OHIO

VEHICLE LOCKING MECHANISM

Application filed June 2, 1924. Serial No. 717,329.

This invention relates to improvements in automobile locking mechanism.

The primary object of this invention is the provision of a lock, which will be simultaneously effective in connection with operating the ignition switch and controlling another part of the automobile mechanism such as the transmission mechanism. Incidentally, a relatively simple type of lock operating on the permutation principle has been devised for the purpose just stated.

A further and important object of this invention is the provision of novel transmission locking mechanism which may be controlled from a lock, either of type indicated or other type, supported in a convenient relation upon an automotive vehicle, as upon the dash.

A further and important object of this invention is the provision of a novel type of transmission lock which is particularly well adapted for use in connection with Ford vehicles, including novel features whereby the planetary gearing mechanism of the vehicle may be controlled to prevent unauthorized persons from operating the vehicle.

A further object of this invention is the provision of novel locking means which may be used in connection with the retention of the transmission cover, the locking means being controlled indirectly by means of a lock which controls the operation of the transmission mechanism itself.

Other objects and advantages of this invention will be apparent during the course of the following detailed description.

To the accomplishment of the foregoing and related ends, the invention, then, consists of the means hereinafter fully described and particularly pointed out in the claims, the annexed drawings and the following description setting forth in detail one manner of carrying out the invention, such disclosed mode, however, constituting but one of the various ways in which the principle of the invention may be used.

In the accompanying drawings, forming a part of this specification, and wherein similar reference characters designate corresponding parts throughout the several views, Figure 1 is a cross sectional view taken through the improved combination lock and switch; Fig. 2 is a front elevation of the combination lock illustrated in Fig. 1; Fig. 3 is a cross sectional view taken substantially on the line 3—3 of Fig. 1; Fig. 4 is a rear elevation of a tumbler operating member used in connection with the improved permutation lock; Figs. 5, 6, 7 and 8 are cross sectional views taken substantially on their respective lines in Fig. 1 of the drawings; Fig. 9 is a front elevation of a detail of this invention; Fig. 10 is a perspective view of a novel type of tumbler which may be used in connection with the lock illustrated in Fig. 1; Fig. 11 is a plan view of a novel type of transmission lock which is particularly well adapted for use in connection with the Ford planetary transmission, by means of which the slow speed, high speed, and reverse speed details may be controlled; Fig. 12 is a cross sectional view taken substantially on the line 12—12 of Fig. 11; Fig. 13 is view illustrating a detail of the transmission lock illustrated in Figs. 11 and 12; Fig. 14 is a fragmentary plan view of a novel type of locking device which may be used in connection with the transmission housings of Ford or other vehicles in order to lock the transmission cover in place; Fig. 15 is a cross sectional view taken substantially on the line 15—15 of Fig. 14, and Fig. 16 is a cross sectional view taken through a detail of the invention illustrated in Fig. 14, this view being taken on the line 16—16 of this view.

In the drawings, wherein for the purpose of illustration is shown only a preferred embodiment of this invention, the letter A may generally designate the improved combination lock and switch which may be used for controlling the operation of the improved transmission lock C. The improved locking mechanism D for the transmission cover E of an automotive vehicle is cooperatively used in connection with the locks A and C, since the locks A and C must be in unlocked relation to permit the unlocking of the mechanism D.

Referring specifically to features of the improved combination lock and switch mechanism A, a dial flange 20 may be provided, which is recessed in circular manner, at 21 upon the inside face thereof, to receive the rear end of the substantially cylindrical shaped casing 22. The forward end of the casing 22 receives a disc shaped front wall piece 23, which may be secured in the forward end of the casing 22 by means of screws 24 or the like, which may be suitably arranged upon the casing to prevent their removal when the lock has been assembled. The improved combination lock A furthermore includes a shaft portion 30 arranged axially within the housing 22, with an end thereof projecting outwardly of the dial piece 20, this shaft portion 30 providing a passageway 31 therethrough within which the ignition switch stem 32 is longitudinally slidable, for purposes which will be subsequently set forth.

This shaft portion 30 is rotatably mounted in the position above described, and to this end a supporting member 34 is arranged within the housing 22, including a disc shaped body portion 35a, and the forwardly extending annular flange 35 which has a recess 36 therein from the outer periphery thereof, adapted to receive a retaining pin 37 which is carried in radial inwardly projecting relation by the housing 22, substantially as is illustrated in Figure 1 of the drawings. The supporting member 34 fixedly receives in the axial opening provided therethrough, a tubular member 38 which is rigid with the supporting member 34, and within which tubular support member 38 the stem or shaft 30 is rotatably mounted in the position above mentioned.

The lock shaft 30 projects through the supporting member 34, and at the forward end thereof detachably supports a radially extending pin 40, which operates within a recess 41 provided forwardly of the body portion 35 of the retaining member 34, inwardly of the periphery of the annular flange 35 thereof. Upon rotation of the shaft 30 the pin 40 is free to rotate in this space or compartment 41.

The shaft 30 at the rear end thereof preferably provides a flat surface 44 and on which end of the shaft 30, outwardly of the dial flange 20 the hand operating member 46 may be mounted, which may be of any conventional character, and which radially supports thereon a screw 47 adapted to set against the flat surface 44 of the shaft 30, so that upon rotation of the hand operating member 46, the shaft 30 may be rotated or moved to operate the tumblers of the lock mechanism A, as will subsequently appear. It may be stated that the member 46 also includes the dial 50 which is provided with graduations 55 thereon adapted to be aligned with an indicator mark 56a which is carried by the dial flange 20 in order to arrive at the proper combination for setting the tumblers.

Referring to the arrangement of tumblers, inner, intermediate, and outer tumblers 56, 57 and 58 are preferably provided, relatively movable, and concentrically supported about the shaft 30. The tumbler 56 is supported directly upon the tubular support 38 above described, whereas the intermediate tumbler 57 is spaced from the tumbler 56 by means of a spacing sleeve or cylinder 59, and the intermediate and outer tumblers 57 and 58 are separated by means of a spacing cylinder 60. These spacing cylinders 59 and 60 at their forward ends are sweated within suitable grooves provided in the rear face of the supporting piece 34, the annular grooves being more particularly illustrated at 65 in Fig. 9 of the drawings.

The tumblers 56, 57 and 58 are of novel formation, and the tumbler 56 has been illustrated in detail in figure 10 of the drawings. Inwardly from the forward edges 70 of these tumblers 56, 57 and 58, a slot 71 is provided which extends for the major length of the tumblers, and it is the object in operating the lock to align the slots 71 of these tumblers with respect to each other, and also with respect to a similar slot 72 which is provided longitudinally in the supporting tubular piece 38, and also with a radial slot 75 which is provided in the supporting member 34, as is illustrated in Figs. 7 and 9 of the drawings, whereby the radial pin 40 carried by the shaft 30 may be moved rearwardly through these aligning slots, in order that the stem 32 may be longitudinally moved for the purpose of operating such mechanism as a transmission lock controlling bolt, or the like. At the rear end thereof the tumbler 56 is preferably provided with a rearwardly extending segment 78, as are also the tumblers 57 and 58 provided with similar rearwardly extending segments 79 and 80. The segment 79 is much wider than the segment 78, as is also the segment 80 much wider than the segment 79; the segment 80, in fact, extending almost the entire circumference about the rear end of the tumbler 58, as is illustrated in Fig. 8 of the drawings, where these segments are illustrated in relation to each other.

As an operating means for the tumblers, a control washer 90 may be provided, which is illustrated in detail in Fig. 4 of the drawings, and which is provided with a central opening 91 therethrough to receive the shaft 30 therethrough. It must be noted that the control washer 90 is provided with a key 92 extending radially into the opening 91 which projects into a slot 94 provided longitudinally in the shaft 30. The washer 90 is clamped between the rear edge of the tubular supporting member 38 and the dial flange 20, and it will of course rotate upon rotation of the shaft 30 incident to the projection of the key 92 into the way 94. This washer 90 is provided with a tumbler operating projection 95 struck forwardly therefrom, which is adapted to engage the segments 78, 79 and 80 of the tumblers 56, 57 and 58 respectively, in order to properly place the slots 71 thereof in the relation above described, so that the pin 40 carried by the shaft 30 may be drawn rearwardly through these aligning slots, to pull the stem 32 rearwardly for operating suitable mechanism, as below mentioned.

It is to be noted that an ignition switch is provided in connection with the improved lock A, and this switch is placed in the forward end of the casing 22, just rearwardly of the front wall 23. It includes an insulation base 100, which is provided with a recess 101 in the forward face thereof, to receive the hub portion 102 of the front wall 23 therein to rotatably support this insulation base 100 in axial alignment within the casing 22. The member 100 is connected with the stem 32 for rotation therewith, by means of a bronze strip 102 which is slidably fitted through a slot 103 provided longitudinally in the forward enlarged end of the stem 32; portions of the strip 102 extending from opposite sides of the stem 32 for engagement in suitable slots provided in the rotatable switch portion 100. This arrangement permits of the longitudinal sliding of the stem 32 as above described, without carrying the strip 102 therewith, but insuring that upon rotation of the stem 32 the base insulation piece 100 will rotate therewith. A separating or partition diaphragm 105 separates the details of the switch from the tumbler details, this diaphragm 105 resting against the rear surface of the insulation member 100 and against the forward edge of the flange 35. A segmental piece 108 of insulation is carried by the housing 22 within the compartment in the housing 22 forwardly of the spacing diaphragm 105, this segmental piece 108 preferably carrying a series of contact screws 109 in insulated relation with respect to the casing 22, and having ends thereof projecting outwardly of the casing for receiving suitable binding posts or the like. The inner ends of these screws are adapted to be contacted in well known manner by ends of a contact spring 110 which is carried by the rotatable insulation base 100. A pin 115 is preferably carried by the forward wall 23 of the improved locking arrangement, and which pin 115 operates against shoulders 116 and 117 to limit the amplitude of opening and closing movement of the switch structure, to accurately determine when the switch is closed and when it is open.

From the foregoing description of this invention it is apparent how the switch operates. The forward end of the stem 32 preferably has a wire or other cable member 118 connected therewith and this cable or wire 118 operates within a hard tubular casing 119 which at an end thereof is screwed or suitably mounted in the wall 23. The combination lock is a four way combination, and it must be successively turned from left to right or from right to left in order to place the tumblers in the relation above described.

In connection with the operation of the ignition switch, it should be noted that the stem 32 will not ordinarily turn upon rotation of the hand engaging member 46, but it is necessary to press inwardly upon the head 120 at the rear end of the stem 32, which meshes the serrated facing surfaces of the head 120 and the hand engaging member 46, in order that the stem 32 may be rotated upon rotation of the hand piece 46. These serrations are illustrated at 121 in Fig. 2 of the drawings. The switch is so arranged that it is necessary to turn the same on when working the combination to pull out the sliding parts for unlocking a transmission or other suitable mechanism, and when it is desired to lock the car the shaft 30 may be pushed into its most forward position so that the pin 40 may operate within the space 41 above mentioned, and upon rotational movement of the hand piece 46 to open the switch for controlling the electric circuit of the vehicle, the tumblers will become disarranged so that the slots 71 and 72 are out of alignment and the combination will have to be properly worked in order to permit the cable 118 to be again pulled to the rear for unlocking the transmission lock C which will now be described.

The improved transmission lock C is adapted for use in connection with the Ford type of transmission K which is of the well known type, including a housing 125 within which the reverse, slow speed, and foot brake bands are located together with the conventional operating shafts therefor. The reverse band, as is well known is provided with a shaft 126, and provided with a spiral spring 127 thereon which engages at one end thereof the movable supporting block 128, and at the other end thereof engages the band lug 129. Similarly the slow speed band is provided with a shaft 130 which has a spiral spring 131 thereabout, under compression, engaging the supporting block 132 at one end thereof, and the band lug 133 at the opposite end thereof, the functions of these springs being that of maintaining the bands loose so that upon operation of the reverse or slow speed pedals they may be respectively tightened, as can be readily understood by anyone skilled in the art to which this invention relates. The improved transmission lock has no cooperating feature in connection with the foot brake band mechanism, but has a cooperating action in connection with the high speed shaft 135, as will be subsequently described.

Referring to the improved transmission lock C, the same includes a supporting plate or member 138, which includes a longitudinal portion 139, with a laterally extending arm portion 140 adapted to be placed over the slow speed band, and at its outer end is provided with a substantially U-shaped portion 142, the recess or socket 143 of which is adapted to receive the adjusting screw 144 of the slow speed apparatus therein, and it is preferred to provide a clamping screw 145 upon this arm 140, which may be clamped into engagement with the adjusting screw 144 to prevent operation of the latter except when the transmission is being operated by authorized persons. The supporting construction 138 also includes a laterally extending arm portion 150, which extends laterally from the opposite side of the bar 139 from that which the arm portion 140 extends, and over the reverse band, including a depending apertured end adapted to receive the reverse shaft 126 therethrough, substantially as is illustrated in Figs. 11 and 12 of the drawings.

The supporting portion 139, substantially midway of its ends is provided with a vertical lug 152, upon which the locking bar 153 is pivotally mounted intermediate its ends. The locking bar at the free end thereof is apertured, at 158 at the forward end thereof, and which apertured portion is adapted to fit within a suitable recess provided at the forward end of the supporting portion 139, so that said aperture 158 may be placed in aligning relation with the apertures 159 and 160 of the supporting portion 139. A locking bolt 162 is pivotally supported, at 163 upon the upper end of the lug 152, and this locking bolt is substantially L-shaped in formation, including a shank portion 164 which is adapted for disposition through the aligning apertures 158, 159 and 160 in order to prevent oscillation of the lock bar 153 when it is desired that the transmission should be locked to prevent placing of the transmission in any of its speeds.

The bolt 162 is mounted so that its shank 164 may be lifted from the apertures of the supporting bar and lock bar, and to this end the cable 118 which has heretofore been explained in connection with the permutation or combination lock, is connected to the bolt 162; at its free end being disposed through a passageway in a swivel block 166 carried by the bolt 162, this swivel block being pivotally mounted upon the bolt intermediate its ends, and carrying a screw 167 which may be clamped in binding engagement against the cable 118 to retain the same in an adjustable position upon the bolt 162. The cable 118 of course extends through the tubular projecting part 119, and this part 119 extends through an aperture 120 in the transmission housing 125, a suitable block 170 being placed within the housing 125 about the end of the tube 119, and the free end of the tube being screw threaded whereby to receive a nut 171 thereon to hold the same in a fixed position against unauthorized detachment thereof.

The lock bar 153, supports an adjusting screw 172 thereon, in diagonally disposed transverse relation thereon, so that the forward end 173 of the screw engages against the supporting block 128, whereby upon any movement of the supporting block the lock bar will be correspondingly moved, if the lock bolt 162 permits such movement. The opposite polygonal head of the screw 172 extends in non-interfering relation with the structure of the reverse band, and it is preferred to provide a lock nut 175a which may clamp the adjusting screw 172 in the desired adjustment. It is to be noted that this adjusting screw 172 is located forwardly of the stud 152, and rearwardly of said stud an adjusting screw 175 may be carried by the lock bar 153, the end 176 of which cooperates against the supporting block 132 of the slow speed brake band, so that any movement of the slow speed brake band support block will transmit such movement to the lock bar 153, as can be readily understood. The adjusting screw 175 is also preferably provided with a lock nut 177 to retain the same in a desired adjusted relation upon the lock bar 153.

With respect to the control of the high speed shaft 135, a lever construction 180 may be provided for clamping upon this shaft 135, which includes the sections 181 and 182, which may be clamped with any desired construction upon the high speed shaft 135, and at its upper end lever 180 pivotally receives a connecting rod 183, which may be adjustable as to length; the forward end of the connecting rod 183 being pivotally connected to the outer arm portion 185 of a bell crank lever 186. The bell crank lever 186 is pivotally connected by a pin 187 to the rear end of the supporting bar 139, so that the other arm portion 188 thereof may operate, in cam like manner, against the rear projecting end 190 of the lock bar 153, and as is illustrated in Fig. 11 of the drawings. In order to bring the lock bar back into its normal relation with the apertures 158, 159 and 160 in aligning relation, it is preferred to provide a relatively flat spring 192, which engages the stud 152 at one end, and at its opposite end engages an upstanding portion 193 of the lock bar 153, substantially as is illustrated in Figs. 11 and 12 of the drawings.

From the foregoing description of the transmission lock, the operation can be readily understood. If the reverse band is tightened incident to operation of the reverse band, the supporting block 128 will be moved to compress the spring 127 and this movement incident to contact of the screw 172 thereagainst will tend to move the lock bar 153 into the position illustrated by the dotted lines in Fig. 11 of the drawings. If the combination lock A had been opened, to permit the retraction of the bolt 162 from the aligning apertures 158, 159 and 160, the lock bar may be swung to this position, but otherwise the reverse cannot be operated. The same is true of the slow speed band operating structure, which may only be operated when the bolt 162 is in retracted relation. The high speed shaft 135 cannot be operated from neutral position into high speed operating position, unless the lock bar 153 is free to swing, as can be readily understood, since in order to operate the shaft 135 it is necessary to swing the bell crank 186 into the dotted position illustrated in Fig. 11, and which is only permitted if the lock bar 153 is free to operate.

It is obvious from the foregoing that the operation of transmission lock C is controlled by the permutation or combination lock A.

Referring to the improved lock structure D for controlling the removal of the cover E from the transmission housing 125, the same bears a cooperating relation with respect to the lock A and the operation of the transmission lock C, in that the combination lock A must be unlocked and the transmission in high gear to permit removal of the cover E.

Referring to the construction of the lock means D the same includes a bell crank lever 200, which is pivotally supported on the cover E, at about the middle portion of said cover, by means of a bolt or pin 201. This pin 201 is squared, at 202, where the same extends through the lever 200, so that rotation of the pin 201 will move the bell crank lever 200 therewith. The pin 201 will have a head 203 which engages against the bell crank lever 200, below the cover to retain the bell crank lever beneath the cover E in the position shown. The screw threaded end of the pin 201 extends above the cover E, and receives thereon a clamping nut 205, it being preferred to kerf the pin 201, as at 206, to facilitate its movement on the cover E by means of a screw driver or the like, so that the bell crank lever 200 may be swung for unlocking the cover. At the free end of one of the arm portions 208 of the bell crank lever 200, it is preferred to pivotally connect a sliding bolt 210, by a bolt 209, and which is supported beneath the cover E, by means of a pin 211 which extends through a longitudinal slot 212 in the sliding bolt 210. At its free end the bolt or lock member 210 is flanged, at 214, so that it may be disposed beneath the flange of the housing 125 to lock the cover to the housing 125. The other arm portion 216 of the bell crank lever 200 has a laterally extending lock bar or bolt 217 pivotally connected thereto, as at 218, and retained beneath the cover in a sliding relation by means of a pin or rivet 219 which is disposed through a slot 220 in the bolt or bar 217, it being a function of the bar 217 to engage below the marginal flange of the housing 125, similar to that above described for the retaining bar or bolt 210. Retaining lugs 225 may also be positioned in a fixed relation, as by rivets 226, beneath the cover E, which are adapted to extend beneath the cover resting flange of the housing 125. The arm portion 216 of the bell crank lever 200 extends rearwardly from the retaining bar 217, and is provided with a socket or recess 230 in the end thereof, into which the upper end of an arm 231 is adapted to extend; the arm 231 being carried by the high speed shaft 135 and consisting of a pair of sections 232 and 233, clamped in any suitable relation on the high speed shaft.

Referring to the operation of the lock structure D, to permit removal of the cover E from the transmission housing 125, as before mentioned the combination lock A must be unlocked to permit the transmission mechanism to be placed in high speed. Normally the transmission mechanism is in neutral, and when the high speed shaft 135 is operated the arm 231 will be removed from the socket or recess 230. The operator may then loosen the nut 205, and with a screw driver the pin 201 may be rotated. This rotation will swing the bell crank lever 200, and withdraw the retaining bars or bolts 210 and 217 from beneath the cover resting flanges of the housing 125, and the cover E upon loosening of the ordinary securing screws 138 thereof may be removed by laterally tipping the same to permit sliding of the retaining lugs 225 from beneath their adjacent flanges of the housing 125.

From the foregoing description of this invention it is apparent that a novel combination lock has been provided, which not only controls operation of the vehicle, but which has a novel ignition switch cooperating therewith. The combination lock must be operated in order to permit operation of the transmission in any of the speeds thereof, as is obvious from the foregoing description, and it is essential to operate the transmission mechanism in high speed in order to unlock the cover E. The transmission lock C is of course safe from unauthorized use and cannot be tampered with, since the cover E is locked at all times when the transmission is in any position except high gear.

Various changes in the shape, size, and arrangement of parts may be made to the form of the invention herein shown and described, without department from the spirit of the invention or the scope of the claims.

In particular, it will be understood that in illustrating my improved lock-controlled ignition switch with one well-known (i. e.

planetary) type of transmission mechanism adapted to be controlled conjointly therewith, I do not mean to imply any limitation in the use of my improved lock to such type of transmission, but it may be with equal advantage applied to other types of transmission gearing. Moreover, my improved device for locking the cover of the transmission housing conjointly with operation (and locking) of the switch is obviously independent of the particular type of transmission gearing in said housing, and may or may not be used along with a separate lock controlling such transmission.

Other modes of applying the principle of my invention may be employed instead of the one explained, change being made as regards the construction herein disclosed, provided the means stated by any of the following claims or the equivalent of such means be employed.

I therefore particularly point out and distinctly claim as my invention:

1. In a combination lock of the class described, the combination of a casing portion, a shaft rotatable and longitudinally slidable in the casing portion, a rod longitudinally slidable in said shaft, a switch base of insulation, means connecting the switch base to said rod so that upon rotation of the rod the switch base will move therewith and be prevented from longitudinal movement when the rod is so moved in said shaft, switch contact means carried by said insulation base, and tumbler means adapted to be actuated upon rotation of said shaft.

2. In a combination lock of the class described, a housing, a sleeve within the housing, a shaft rotatable within the sleeve having a handle engaging end thereon and a pin projecting laterally therefrom within the casing, tumbler means within the casing including slots which when aligned are adapted to receive the pin of the shaft to permit pulling of the shaft outwardly from said casing. a rod reciprocably disposed in said shaft including a handle portion which may be connected with the handle portion of said shaft for rotation therewith, and switch means in the casing controlled by rotational movement only of said rod.

3. In a transmission lock mechanism of the class described, a supporting plate, a lock bar pivoted to the supporting plate intermediate the ends, an adjusting screw carried by the lock bar laterally projecting therefrom at one side of the pivot axis of said lock bar, a second adjusting screw carried by the lock bar in laterally projecting relation at the opposite side of said pivot axis of the lock bar, means for locking the lock bar to said supporting plate, and a bell crank lever pivoted to the supporting plate at an end thereof adapted upon movement in one direction to engage the lock bar so that when the latter is locked the bell crank will be prevented from movement.

4. In combination with a planetary transmission mechanism including a high speed shaft, and reverse and slow speed movable supporting blocks, a member stationary with respect to the transmission mechanism, a lock bar pivoted intermediate its ends upon said member, a bolt pivoted on said stationary member including an end adapted to lock the lock bar to said stationary member, means for actuating said bolt member from without the transmission mechanism, adjusting screws carried by the lock bar at opposite sides of the pivot axis thereof for controlling the movable supporting blocks of said transmission mechanism, a bell crank member pivoted on said supporting member adapted to engage the lock bar when moved in one direction, and means connecting the bell crank with the high speed shaft so that upon attempted operation of the high speed shaft the bell crank lever will move against said lock bar normally tending to actuate the same upon its pivot axis.

5. In a transmission housing lock, the combination of a bell crank lever pivoted on the housing cover, lock means connected with said bell crank engaging the housing at different points to normally lock the cover on said housing, and means carried by the high speed controlling mechanism of said transmission mechanism to prevent operation of said bell crank lever except when the transmission mechanism is in high speed position.

Signed by me, at Cleveland, Ohio, this 26th day of May, 1924.

ELMER C. PETERSON.